United States Patent
Haley et al.

(10) Patent No.: US 6,529,941 B2
(45) Date of Patent: Mar. 4, 2003

(54) EXTENSIBLE INFORMATION DISTRIBUTION MECHANISM FOR SESSION MANAGEMENT

(75) Inventors: Michael Haley, San Rafael, CA (US); Lars B. Karle, Portsmouth, RI (US)

(73) Assignee: Fraunhofer Center for Research in Computer Graphics, Inc., Providence, RI (US)

( * ) Notice: Subject to any disclaimer, the term of this patent is extended or adjusted under 35 U.S.C. 154(b) by 0 days.

(21) Appl. No.: 10/069,255
(22) PCT Filed: Mar. 23, 2001
(86) PCT No.: PCT/US01/09204
§ 371 (c)(1),
(2), (4) Date: Feb. 21, 2002
(87) PCT Pub. No.: WO01/71512
PCT Pub. Date: Sep. 27, 2001

(65) Prior Publication Data
US 2003/0018717 A1 Jan. 23, 2003

Related U.S. Application Data
(60) Provisional application No. 60/191,707, filed on Mar. 23, 2000.

(51) Int. Cl.[7] .............................................. G06F 13/00
(52) U.S. Cl. ..................................................... 709/204
(58) Field of Search ............................... 709/200, 206, 709/204, 205, 223; 370/260, 352

(56) References Cited

U.S. PATENT DOCUMENTS

| | | | | |
|---|---|---|---|---|
| 5,634,010 A | * | 5/1997 | Ciscon et al. ................ | 709/223 |
| 5,748,618 A | * | 5/1998 | Rothrock ..................... | 370/260 |
| 5,790,790 A | * | 8/1998 | Smith et al. ................. | 709/206 |
| 5,999,525 A | * | 12/1999 | Elliott et al. ................ | 370/206 |
| 6,006,254 A | * | 12/1999 | Waters et al. ............... | 709/205 |

\* cited by examiner

Primary Examiner—Robert B Harrell
(74) Attorney, Agent, or Firm—Gordon E. Nelson

(57) ABSTRACT

A technique for managing conference state. Endpoints of the conference are application processes (1803) running on computer systems that are connected by a WAN (1811). Each of the application processes (1803) maintains endpoint state for the conference. A session manager process (1812) in each of the computer systems maintains session manager state for each of the conferences that has an endpoint on the computer system. The session manager conference state includes a copy of the endpoint state for each of the conferences and the session manager (21) uses a locking mechanism to that the copies of the session manager conference state in all of the session managers (21) are identical. When an endpoint changes its endpoint state, it informs the session manager (21), the session manager (21) incorporates the change into its session manager conference state, and when the locking mechanism permits, exports the change to the session managers (21) for all the other endpoints. When the session manager (21) receives a change, it incorporates the change into its session manager conference state.

17 Claims, 19 Drawing Sheets

EXTENSIBLE INFORMATION DISTRIBUTION MECHANISM FOR SESSION MANAGEMENT

CROSS-REFERENCE TO RELATED APPLICATIONS

This patent application claims priority from U.S. provisional patent application 60/191,707, Michael B. Haley, et al., *Extensible information distribution mechanism for session management,* filed Mar. 23, 2000.

BACKGROUND—FIELD OF INVENTION

This invention relates to the dissemination of information in networked computer software, specifically for the purposes of distributed session management, that is, the management of participating users and software modules in a distributed computing environment.

BACKGROUND—DESCRIPTION OF PRIOR ART

It is common modern software practice to develop software applications which are distributed. Examples of such applications range from video conferencing systems to virtual environments and 3D games. Typically, when a distributed software application is running, it manifests itself as a collection of software applications, with each application running on a workstation connected to the public Internet. The public Internet may be considered to operate as a wide area network (WAN). In our discussion here the term "end-point" will be used to refer to a particular application executing on a single workstation.

These distributed software applications group each end-point into a conference of end-points. Here the term "conference" refers to the logical grouping of the end-points. The establishing of this conference of end-points is a complex process due to the simplicity of the underlying WAN protocols. Furthermore, once end-points are grouped into a conference it is necessary to communicate state and configuration data of the end-point applications between each participant. Once again this is a complex task to perform reliably and efficiently.

In these applications a "session-manager" software component is usually employed. This software component is responsible for identifying and monitoring the participants in the conference and can also be made responsible for communicating the state and configuration information between end-points. Traditionally session-manager implementations suffer from many flaws that we have overcome in our invention.

The session-manager approach was used in the MBONE project in early 1990 as presented by Hans Ericksson in "MBone—The Multi-cast Backbone, *INET* 1993. In the MBONE project a "session directory" application was provided which managed the list of people with whom one might communicate using the IP multicast standard. Numerous protocols such as the session announcement protocol (SAP) and the session initiation protocol (SIP) were employed in this implementation. This manifestation of session management was very simple and included only the most basic information about the user such as a name and a location. It did not include any information regarding the user's application or any information about other forms of communication open between users. Also it did not operate as a readily usable process for applications to use for session management.

Most "session-management" applications generally execute as external processes on all computer workstations that are participants in collaborative network sessions. The main application software will communicate with the "session-manager" to advertise its presence to the other participants of a conference or to announce the existence of a new conference. (In our terminology here a "conference" refers to a logical grouping of end-point applications on the same WAN). When an end-point application terminates or disconnects from the conference the "session-manager" is also responsible for announcing this fact to the other participants.

In most applications the use of the "session-manager" to locate other participants and to announce one's presence is only a first step. Normally this will be the prerequisite for initiating some other form of communication between the known participants. An example of this would be a video conferencing application where once the participants in the videoconference are known, a digital video signal is generated from numerous end-points and is communicated to all other end-points. In order to generalize and automate the initiation of this other form of communication it is necessary to communicate its parameters and its nature between the participants. This type of "extended" behavior is not provided by most session manager implementations and this is the focal point in the design of our system.

Most early systems that required session management used a client-server approach, as maintaining data at a single source obviates the need for complex arbitration or locking techniques. However these client-server based systems suffer from numerous disadvantages such as:

(a) Low error tolerance—if the server fails then everything fails.
(b) Lack of scalability—all participants need to communicate to the same network end-point. When the number of participants exceeds a threshold the communication becomes prohibitively slow and eventually impossible.

The reliability and scalability problems of the centralized session managers can be overcome using distributed session managers. Examples of this approach are:

U.S. Pat. No. 5,748,618 to Rothrock (1998) discloses a mechanism for arbitration in a distributed data conferencing system for accessing shared data stored using a hierarchical representation. The patent is concerned with sharing visual data in small-scale (not suffering from the disadvantages mentioned above) collaborative environments and does not consider scalability issues of moving to larger systems as well as generalized data distribution between conference participants.

Similarly U.S. Pat. No. 5,634,010 to Ciscon (1997) addresses solely the communication of data between external processes. No consideration is given to the greater problem of identifying external processes and logically grouping them into conferences.

Some software systems (for example the Nexus system for developing applications, described in I. Foster, C. Kesselman, S. Tuecke, "The Nexus Approach to Integrating Multithreading and Communication", *Journal of Parallel and Distributed Computing,* 37:70–82, 1996), provide session-management functionality.

None of the prior-art session managers in both completely distributed and completely extensible. Session managers with these characteristics are required to support modern collaborative network software. Problems in the design of completely distributed session managers include the division of session management tasks between the end point and the session manager, the amount of state maintained in each session manager, and avoiding deadlock and race conditions in making changes in the session managers. Problems in the design of easily extensible session managers include making it possible to add new kinds of applications and conferences or use the session manager on different platforms without having to redesign the session manager. It is an object of the invention disclosed herein to overcome these problems and provide a completely distributed, completely scalable, and completely extensible session management system.

SUMMARY

The session manager of the invention provides a completely distributed session management system by maintaining session manager conference state that ensures that each end point in a conference has a current copy of the endpoint conference state for the conference. A given session manager provides any changes made by its endpoint in the endpoint conference state to the session managers for the other endpoint and provides any changes in the endpoint conference state that it receives from other session managers to its endpoint. A distributed locking mechanism in the session manager conference state ensures that the given session manager sends changes to the other session managers only when all of the other session managers are ready to receive them. Complete scalability is achieved because a given session manager contains session manager conference state only for those conferences that have endpoints on the computer system in which the session manager is executing.

In another aspect of the invention, the session manager maintains a complete copy of the endpoint conference state in the session manager conference state. Where the endpoint conference state is hierarchical, the copy in the session manager conference state uses a representation of the hierarchy which remains valid when part or all of the copy of the endpoint conference state is provided to another session manager.

When an endpoint wishes to join a conference, all that is required is that its session manager obtain a copy of the session manager conference state from another session manager and provide the endpoint conference state in the copy to its endpoint. When an endpoint establishes a conference, the endpoint makes the endpoint conference state for the conference, the session manager makes session manager conference state for the conference including the endpoint conference state, and when another endpoint joins the conference, the session manager provides its session manger conference state to that endpoint's session manager.

The session manager of the invention is completely extensible because the operations it performs are restricted to incorporating changes in the endpoint's endpoint conference state into the session manager conference state for the conference, providing the changes in the session manager conference state to the session managers of the conference's other endpoints, receiving changes from the other session managers, incorporating them into the session manger conference state, providing changes in the endpoint conference state portion of the session manager conference state to the endpoint for incorporation into the endpoint conference state, and using the locking mechanism to ensure that each session manager's copy of the session manager conference state is the same as that of all the others. The session manager thus need have no knowledge whatever of the details of the endpoint's endpoint conference state.

The session manager is further independent of changes in endpoints, conferences, and platforms because it employs a representation for the session manager conference state which can represent any form of endpoint conference state. A translator running in the endpoint translates endpoint conference state into the proper form for the session manager conference state and vice-versa. In a preferred embodiment, the representation is XML, with translation to and from XML for a particular combination of conference, endpoint, and platform being defined by a DTD for the combination that is accessible to the translator.

Still further objects and advantages will become apparent from a consideration of the ensuing description and drawings.

BRIEF DESCRIPTION OF THE DRAWINGS

The features and benefits of the present invention will become clearer and more apparent following a detailed description of the preferred embodiment in conjunction with the following drawings.

DESCRIPTION OF THE PREFERRED EMBODIMENT

System Hardware

Figure 1:
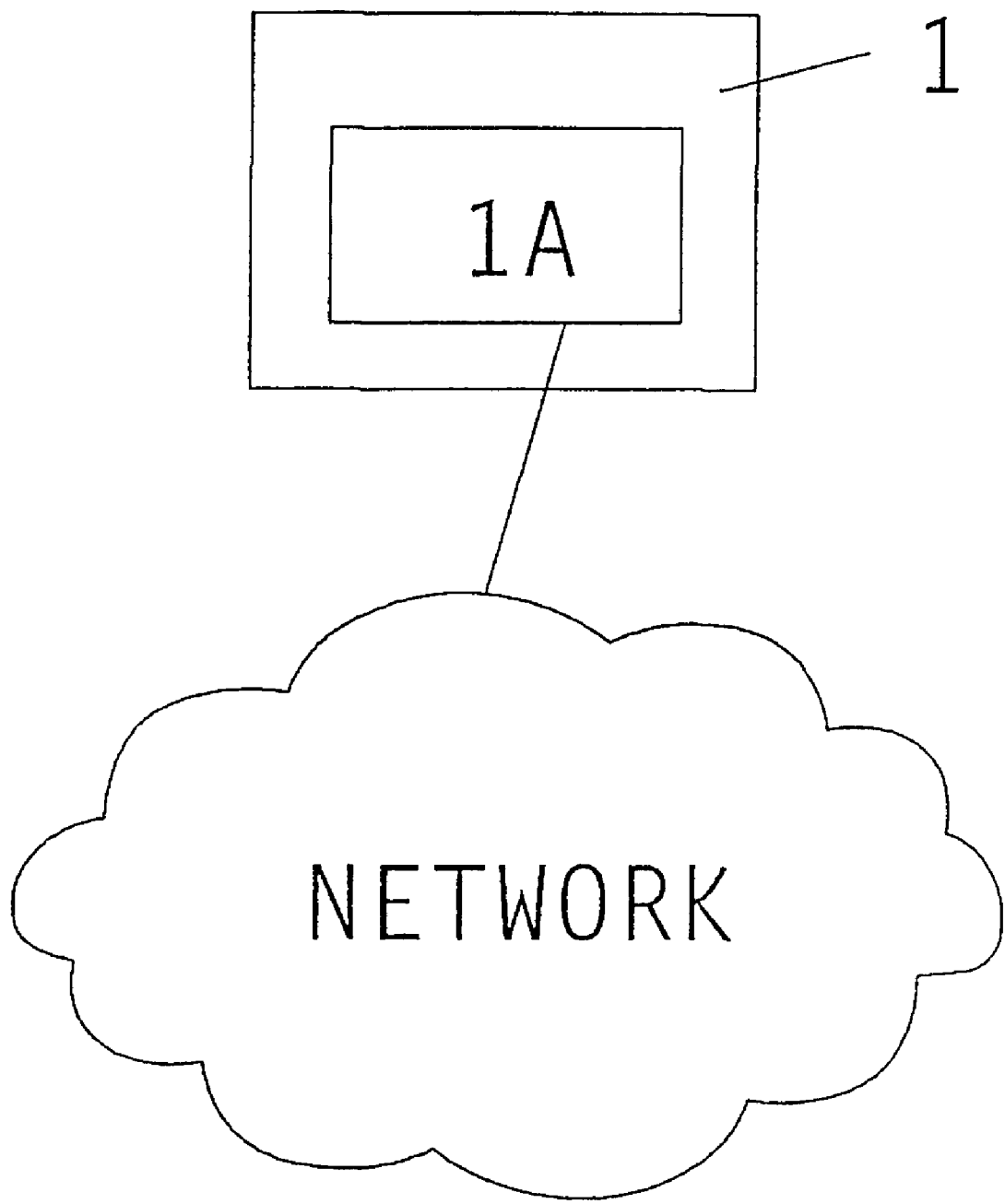
FIG. 1 shows a network level view of a workstation with a session manager component connected to a WAN.
Figure 2:
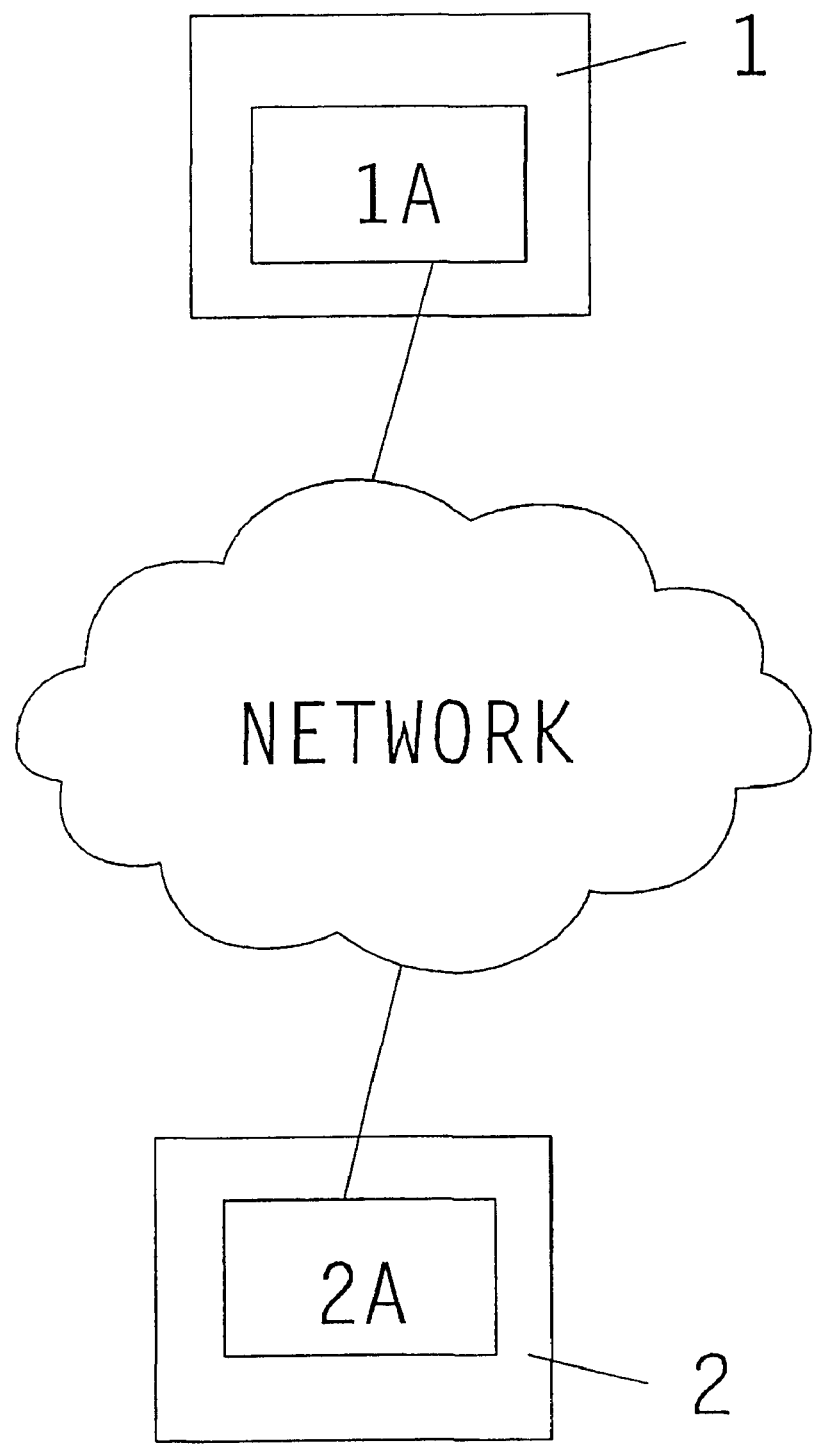
FIG. 2 shows the same network level of a session manager component connecting to a WAN, but this diagram depicts two workstations connecting, and potentially communicating.
Figure 3:
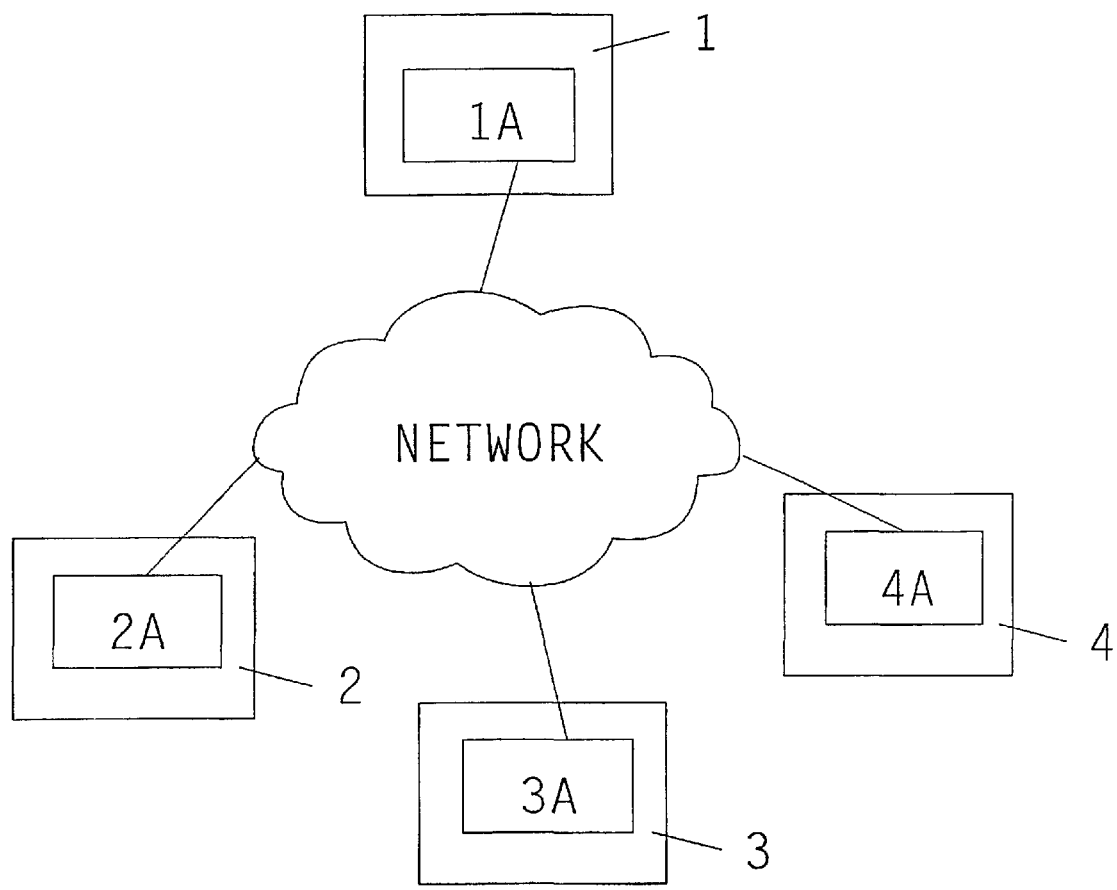
FIG. 3 shows numerous workstations connected to a WAN with their session managers all potentially communicating.

FIGS. 1 through 3 depict the reference system hardware necessary for executing our invention, consisting of one or more workstations connected to a WAN. The workstations referred to contain a microprocessor and primary memory for storing and executing the software, as well as secondary storage for static storage of the software and data files required. Each workstation is in turn connected to a WAN using one of a number of available network interfaces. The medium of communication may be any medium that supports logical identification of endpoints, automatic routing between endpoints, reliable point-to-point communications, as well as non-reliable many-to-many communications. In FIG. 1 only a single workstation is connected to the WAN (depicted by a cloud). The WAN consists of a potentially infinite collection of workstations some of which are end-points and others are routers to different sub-networks. The communication transports used between routers and workstations may range from high-speed LANs (local area networks typically employing an Ethernet) to POTS (plain old telephone systems) connections. Therefore the data transfer between any pair of workstations on the WAN may occur through numerous different media each with its own characteristic transfer rate and data loss rate. In FIG. 2, workstation 1 and workstation 2 may communicate with each other but a network route must first be established between the two workstations. Establishing the route involves determining the location, identification and identification of the network end-points, followed by the transfer of data. This functionality is intrinsic to most WAN protocols and falls outside the scope of our invention. In FIG. 3, numerous workstations are intercommunicating on a many-to-many basis across the same WAN. Once again the data is being "routed" between the workstations over a multicasting network of interconnections (The term "multicast" refers to the ability to transmit data onto the WAN and have it received by any multitude of workstations that are listening for the data.) This type of transfer is often referred to as "unreliable multicast transfer" and is generally an unreliable mechanism for communicating data, i.e. data packets can be lost or may change packet ordering.

It is however, possible to implement another level of protocol on top of an existing unreliable multicast implementation to achieve a reliable (no data is lost or mis-ordered during transmission) multicast that guarantees no data loss and maintains packet ordering. It is this mechanism that our invention uses for communicating among the session manager components on distributed workstations. An example of such a higher-level protocol is the well-known TCP protocol belonging to the Internet protocol suite.

Software Environment

Figure 4:
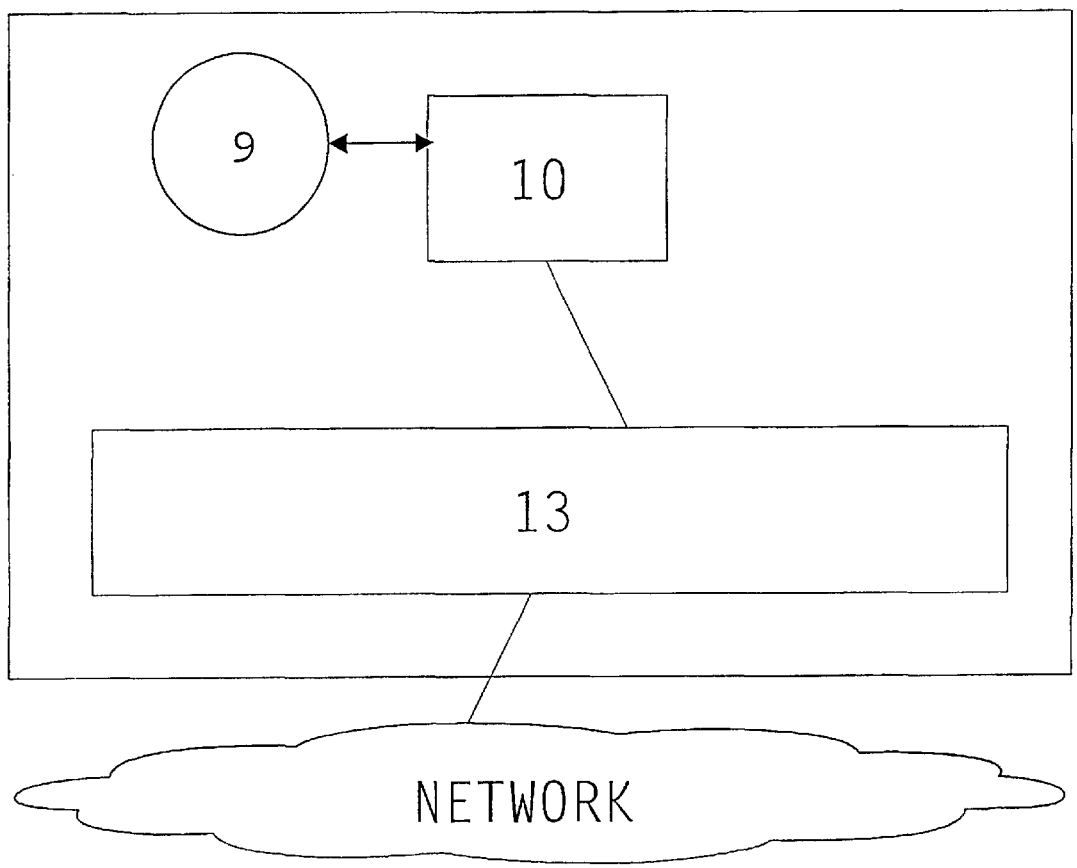
FIG. 4 depicts the configuration of installed software and network interfaces for a single workstation running a single application instance.

FIG. 4 depicts a common execution environment for our invention. Application 10 interacts with the workstation user 9, and whenever any conference-specific data communication (data which is logically connected to a particular conference) needs to occur, the application communicates with session manager component 13 that is executing on the same workstation. The communication is performed using a well-defined interface between session manager 13 and application 10. The session management component 13 then communicates changes made by application 10 in the conference-specific data to other remotely executing session management components via the network as depicted in FIG. 2 and FIG. 3. Similarly, any changes in conference-specific data for application 10 that arrive from remote session management components via the network is received by session manager 13 and possibly transferred to application 10.

Figure 5:
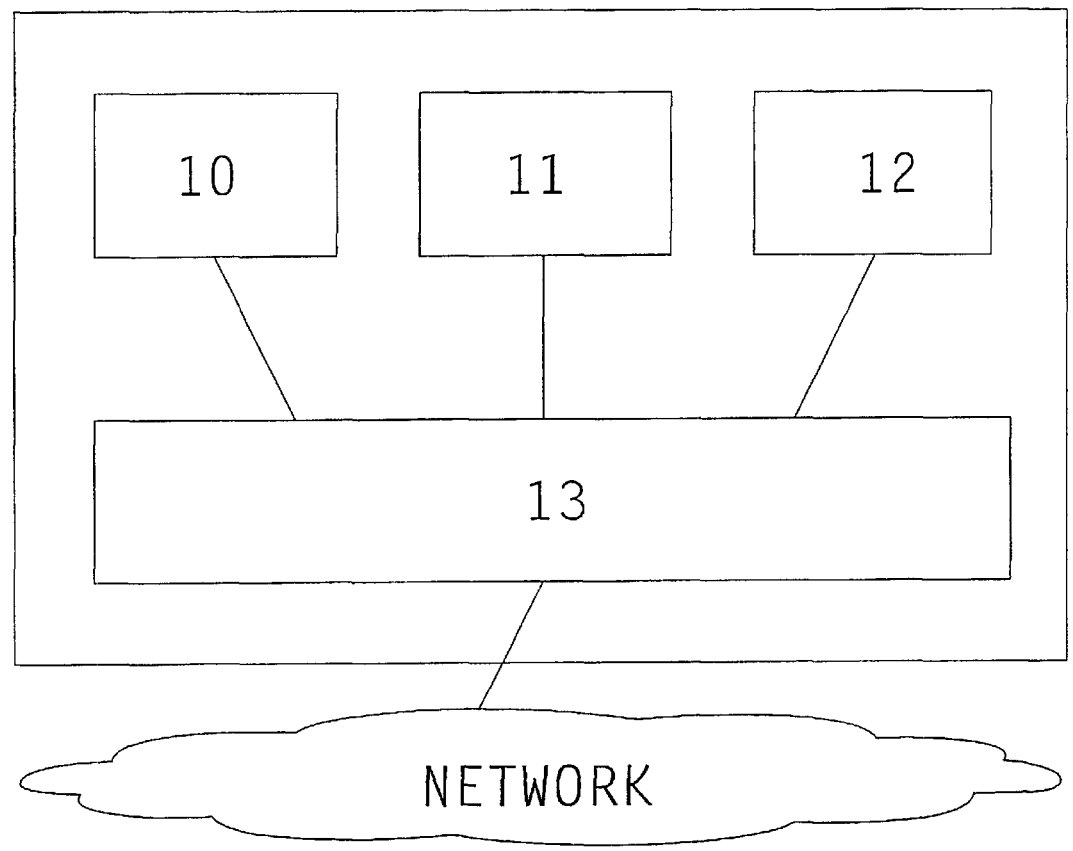
FIG. 5 depicts the software and network interactions for a single workstation running numerous applications simultaneously.

FIG. 5 shows the same environment but with numerous applications: application 10, application 11, and application 12; all executing on the same workstation. Once again, only a single session management component is required, and all conference specific data communication is carried out by first communicating with session manager 13, and then session manager 13 in turn communicates with the remote session managers over the WAN as depicted in FIG. 2 and FIG. 3. Information arriving from the network at session manager 13 is then dispatched according to relevance to one or more of the applications: application 10, application 11, and application 12.

Figure 6:
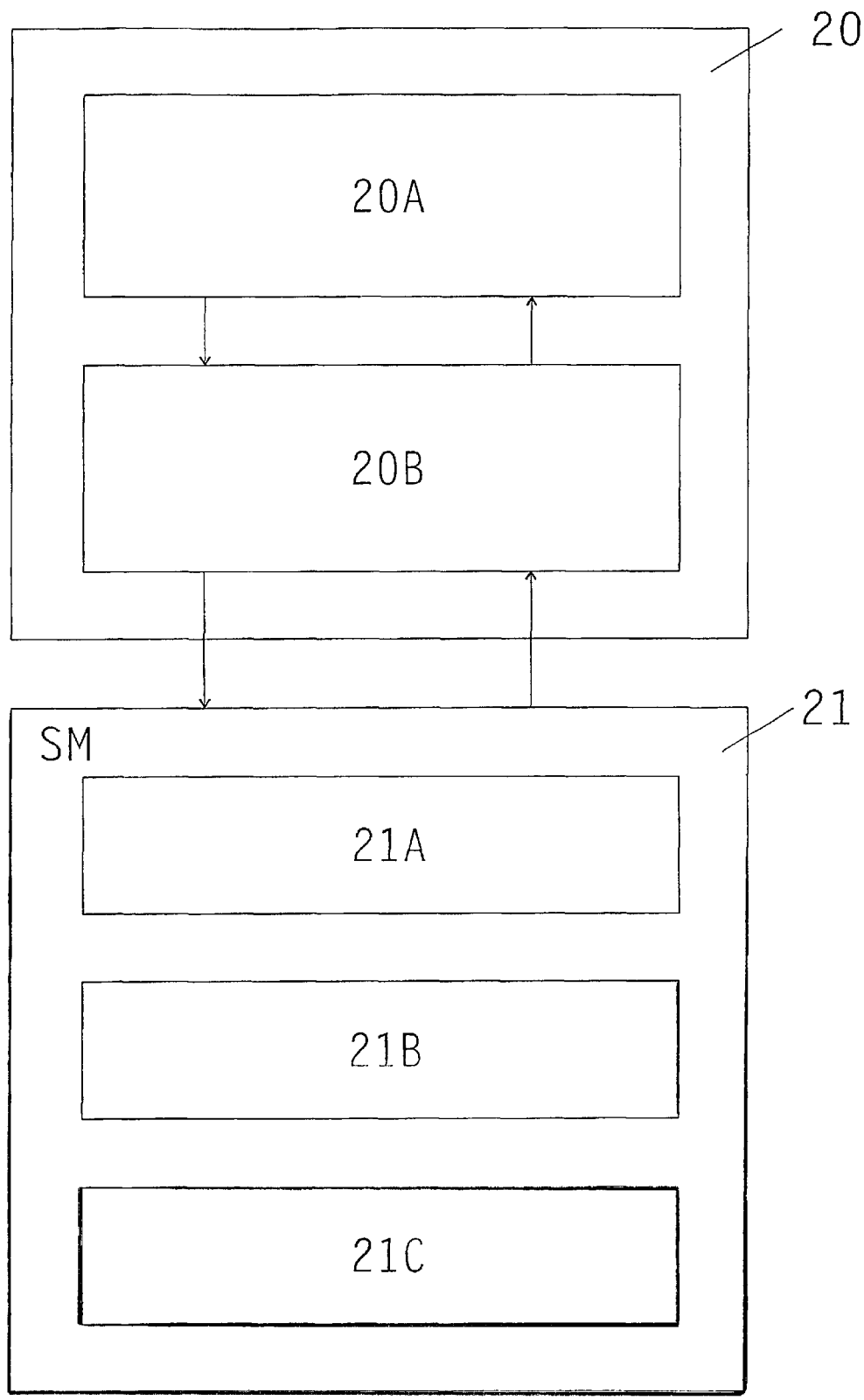
FIG. 6 is a diagram of logical software processes executing on a typical workstation and the separation of the software components internal to each process.

The executing processes may therefore be divided into two categories: application or session manager. For the purposes of further discussion, however we will refine this categorization a little further in FIG. 6. Here process 20 is an application process, and process 21 is a session manager process. As explained above they interact through a defined interface, which allows data objects to pass from the application to the session manager and vice-versa. The application process may be divided into two sections: an application code section 20A, which consists of application-specific source code; and a framework-specific section 20B, which consists of network source code for communicating with the session manager. The application code 20A communicates with the framework code 20B and framework code 20B in turn communicates with the workstation's session management component 21. The use of framework code 20B hides the details of communicating with the session manager from application code 20A.

Similarly the session management component 21 may also be divided into three parts: client interface 21A responsible for communicating with the applications on the same workstation; repository 21B for storing hierarchies of objects for the conferences in which the applications on the workstation are participating; and network interface 21C responsible for communicating with remote session management components over the network. It should be pointed out here that an important aspect of the scalability of the distributed session management system disclosed herein is that each session manager contains only the state necessary for the conferences in which applications on that session manager's work station are currently participating.

Conferences and Session Objects

In our discussion, "conference" refers to a logical grouping of end-points running on a possibly disparate collection of workstations as depicted in FIG. 3. An application process that currently belongs to a conference maintains a hierarchy of objects that contain the conference's state, as depicted in process 20 in FIG. 7. Here two conferences are established, conference 30 an conference 30'. Then belonging to these conferences is object 30A, object 30B, and object 30C respectively where object 30B belongs to both conferences. Object 30D belongs to object 30A. Object 30E belongs to object 30B, and object 30F belongs in turn to object 30E. Therefore this hierarchy represents a directed acyclic graph with many root needs, each one a conference.

Figure 7:
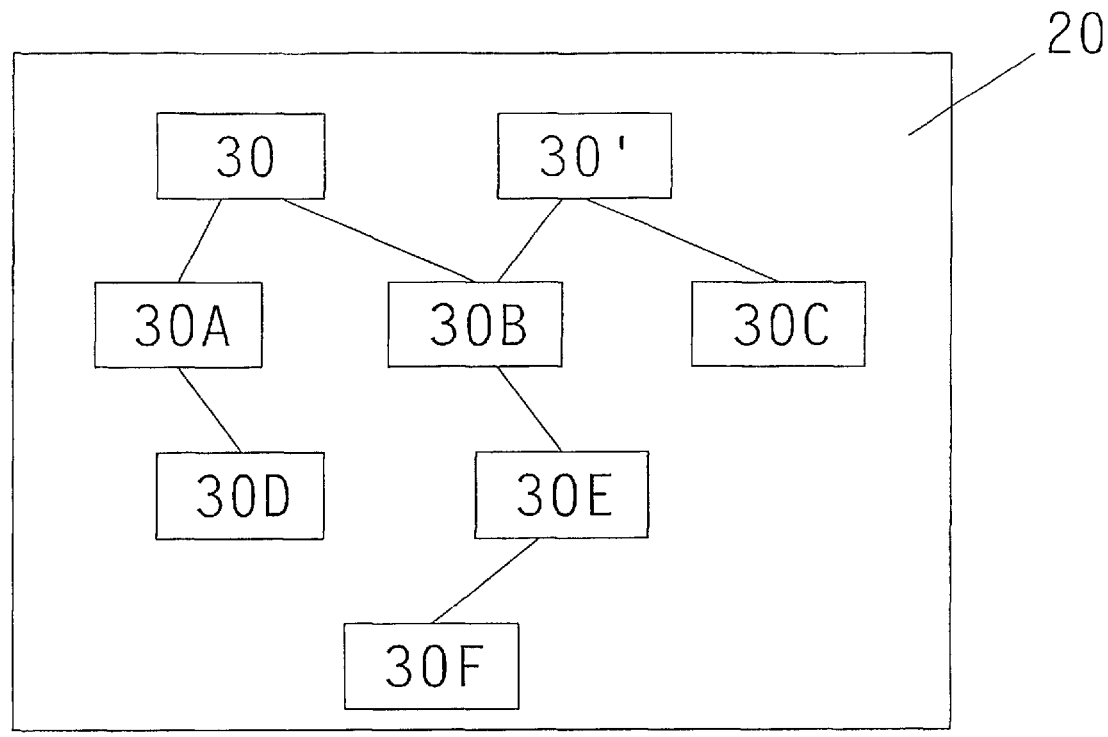
FIG. 7 contains a diagram of a typical hierarchy of objects maintained at both the application level and at the session manager level.
Figure 7:
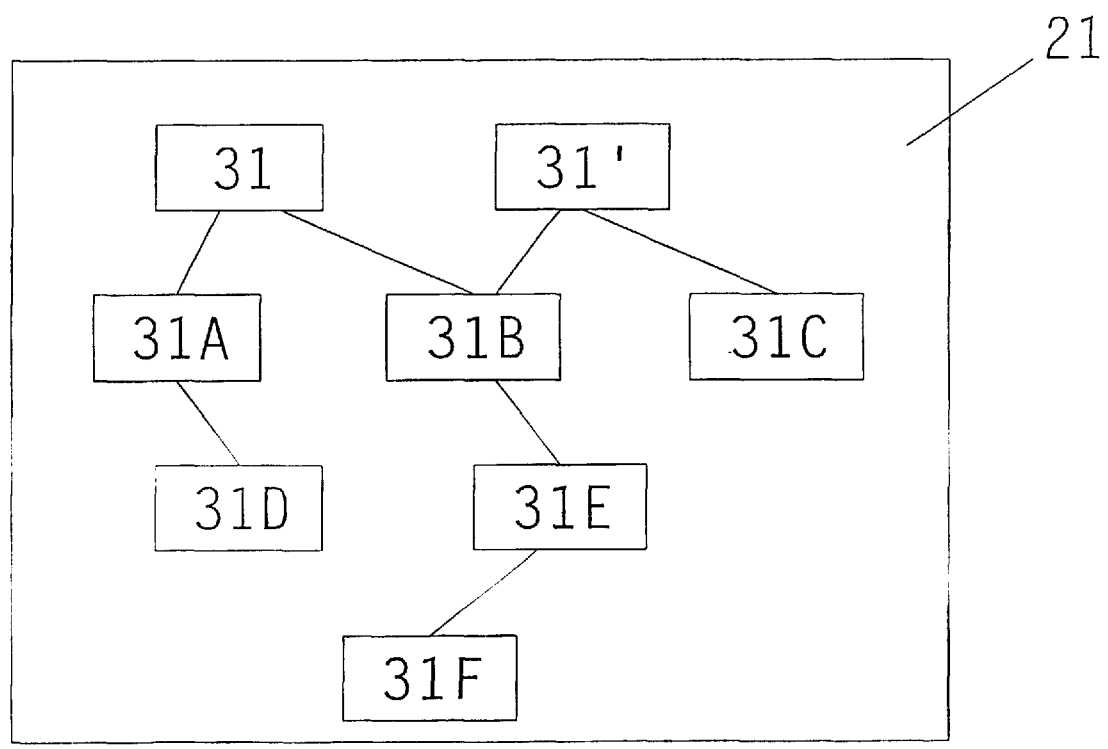

In any software application that creates and manages the said objects, the complexity of the objects may be high and the storage scheme may be operating system-specific or hardware-specific. To alleviate this and to achieve platform independent, the session manager component builds an intermediate representation of the application objects called "info" objects in repository 21B. The intermediate representation is used in all of the session manager distributed session manager components and is also the form in which conference state is sent from one session manager to another across the network. Included among the info objects is a conference object that describes the conference participants and the security required to join the conference. Associated with the conference object are information objects that contain exact reproductions of the information in the objects that the application process uses to represent the conference state. The session manager is thus able to maintain in its repository 21B a hierarchy of info objects which mirrors the hierarchy of objects maintained by the application process. This is shown in FIG. 7 where application process 20 has created a hierarchy of objects and the session manager 21 maintains a matching hierarchy of information objects. The conference objects are at 31 and 31'. In a preferred embodiment, objects corresponding to the conference objects are included in the hierarchy maintained by the application process; in other embodiments, the conference objects may be invisible to the application processes.

Figure 8:
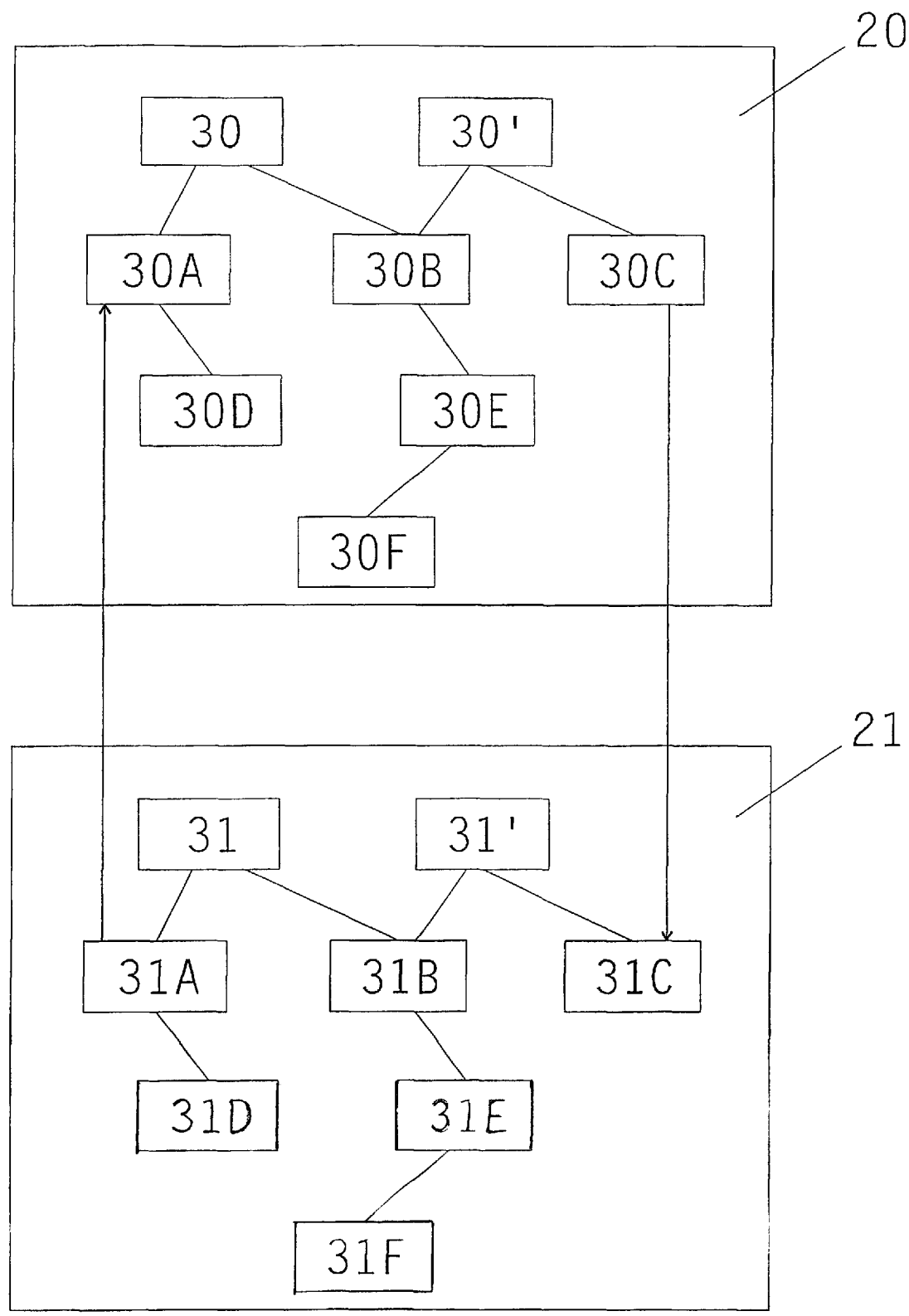
FIG. 8 depicts the same hierarchy of objects at both session manager and application levels but also depicts the interactions between equivalent objects.

As the application makes changes to its objects, these changes are reflected to the session manager, which in turn changes the corresponding info objects and sends copies of the changed info objects via the network to the session managers for other conference end points. If the session manager receives a changed object belonging to the conference state from another session manager, then the session manager changes the corresponding info object in its repository and reflects the change to the application process. The manner in which changes made in the application process's hierarchy of objects is reflected in the session manager's info objects and vice-versa is expressed in FIG. 8.

Figure 9:
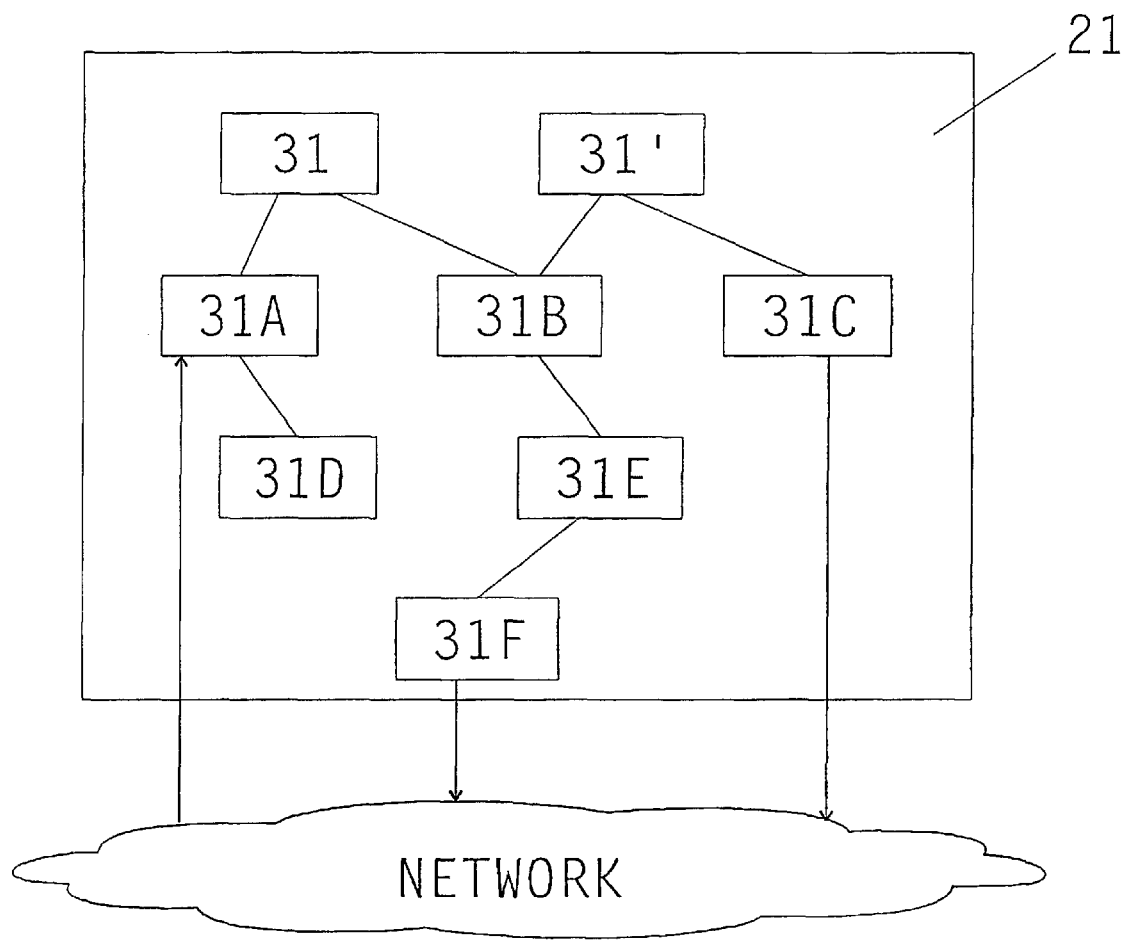
FIG. 9 is a diagram of hierarchical object communication over a WAN from the viewpoint of one specific session manager.

The manner in which the session manager outputs changed info objects to the network and receives them from the network is shown in FIG. 9. There, if info object 31C were to change (as a result of an object change at the application level) then all session managers on the network containing conference 31' would be notified of the nature of the change. If info object 31F were to change then all session managers containing either conference 31 or conference 31' will be notified. At any time a session manager may also receive a description of a changed info object from the network (depicted as an arrow towards object 31A in FIG. 9).

Our discussion here centers on the changing of existing application objects or info objects, but similarly when objects are created and destroyed at the application level these facts are forwarded to the session manager, which modifies its own information objects and then communicates the creation or destruction to other session managers carrying the relevant conferences. The exact method by which changes are communicated across the network may be any of a number of prior art techniques for low-level network communication of data to multiple end-points.

Representing the object hierarchy

As presented in FIG. 7, the application process 20 and the session manager 21 maintain equivalent object hierarchies. In both hierarchies the relationships between the objects are represented by information in each the object that identifies the object's parent(s) or children. In a preferred embodiment, the application process assigns each object in the application process's hierarchy a unique uniform resource locator (URL); where an object is a parent or child of a given object, the given object uses the other object's URL to identify it as a parent or child. The URL that the application project assigns to each object is based on the identity of the workstation, the conference in which the object exists, and the nature of the object. These same URLs are then used in the same way in the corresponding info objects in the repository. Moreover, the URL persists during the transmission over the network, in the repository of the receiving session manager, and in the object hierarchy maintained by the end point at the work station on which the receiving session manager is executing. Consequently, a given info object's URL is used by each session manager to refer to the session manager's copy of the info object and to the corresponding object maintained by the application-level process that is running in the session manager's workstation. The URLs are also used for communicating object deletion or creation from the application level to the session manager level and vice versa.

Representing information in the info objects

If the session management system is to be usable with application running on many different kinds of workstations, the info objects must be represented in a platform-independent and operating system-independent way. Moreover, the representation must be such that the session manager can perform its functions without any knowledge of the contents of the application-level object represented by the info object. Finally, the representation must be such that it can be easily extended to new kinds of platforms and new applications.

All of these issues are dealt with in the preferred embodiment by encoding the contents of the info objects in the well-known XML (Extensible Markup Language). For details, see http://www.w3.org/TR/REC-xml.

Whenever an object is communicated from the application process to the session manager, the object is encoded in XML; whenever an object is communicated from the session manger to the application process, the object is decoded from XML. When the session manager sends an object to another session manager via the network, the object remains encoded in XML. The encoding and decoding of the application object's contents are done by framework code 20B executing in the application process. As is standard practice with XML, the manner in which the XML is encoded or decoded is determined by a document type definition (DTD) particular to the application. The DTD may be part of the application, or the application may simply have the URL of a DTD.

Figure 19:
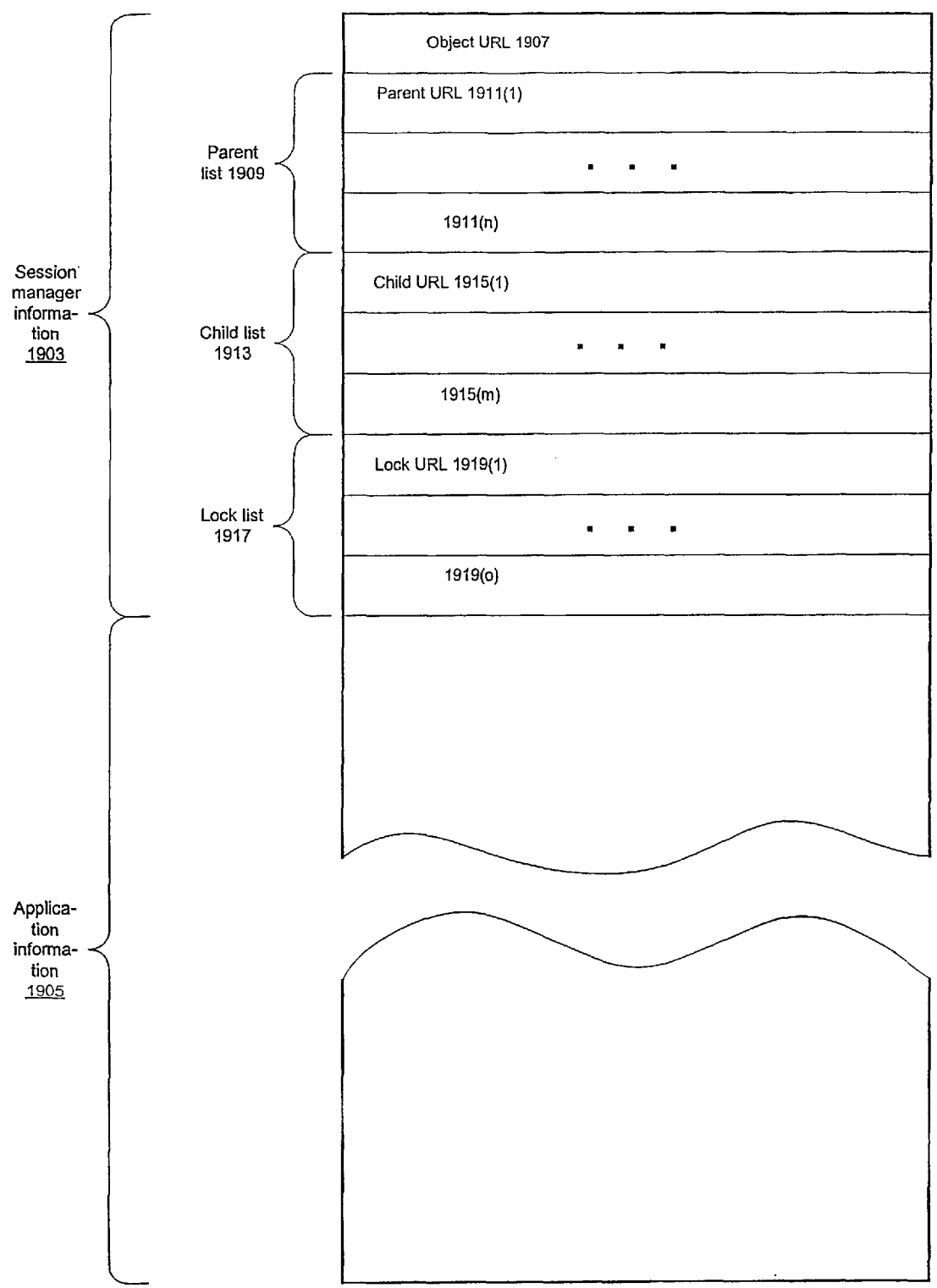
FIG. 19 is a detailed view of an info object.

FIG. 19 shows details of an info object 1901. The object has two parts: session manager information 1903, which is the information the session manager needs to manipulate the object, and application information 1905, which is the contents of the object as created and used by the application except for the URLs for the object, its parents, and its children, which are in the session manager information. Everything in the info object is encoded by XML. The contents of application information 1905 are encoded and decoded using the DTD specific to the application; the contents of session manager information 1903 are encoded and decoded using a DTD that is common to all of the session managers. As is apparent from this discussion, framework code 20b encodes or decodes application information 1905, while the session manager encodes or decodes session manager information 1903.

Session manager information 1903 contains the URL 1907 that identifies both the given information object and the corresponding object in the application process, a list 1909 of URLs 1911 of objects that are parents of the given information object and the corresponding application process objects, and a list 1913 of URLs 1915 of objects that are children of the given information objects and the corresponding application process objects. These URLs are all received from the application process that first makes the corresponding application process objects. Session manager information 1903 additionally includes a list 1917 of URLs 1919 of lock objects, information objects that are used to control access by the session manager to other info objects. Locks and access are managed completely by the session managers. The locks are invisible to the application process and the lock objects are not part of the application process objects. Locks will be discussed in more detail in the following.

When the info object is a conference object, it is at the top of the hierarchy and has no URLs in parent list 1909. Application information 1905 in the conference object contains information about the conference such as the network addresses of the session managers for the other endpoints and the security constraints that have to be satisfied by endpoints that are joining the conference.

Locking and Tokens

Another problem is distributed session management in the race and deadlock conditions that can result where many end point can simultaneously access an information object. The problem is resolved in the preferred embodiment by means of distributed locks. A lock is simply a mechanism for ensuring that only one end point at a time can change the information objects for the conference in the session managers and that the information objects will be changed by all the session managers before the next change is made.

Locking is controlled by a token that circulates among the session managers; when a given session manager has the token for a lock and wishes to change an information object that is associated with the lock in response to a change made in the local endpoint, the given session manager sends a message to each of the other session managers in the conference indicating that the session manager wishes to change an information object associated with the lock. The other session managers then lock their locks, i.e., they will not make changes requested by their end point on information objects associated with the lock, and inform the given session manager that they have done so. When the given session manager has responses from all of the other session managers, the given session manager makes the changes to its own repository, releases the token, and broadcasts the changes to the other session managers. An object may be associated with more than one lock, and when that is the case, the object may be modified only when the session manager has proceeded as described above forth both locks.

Figure 10:
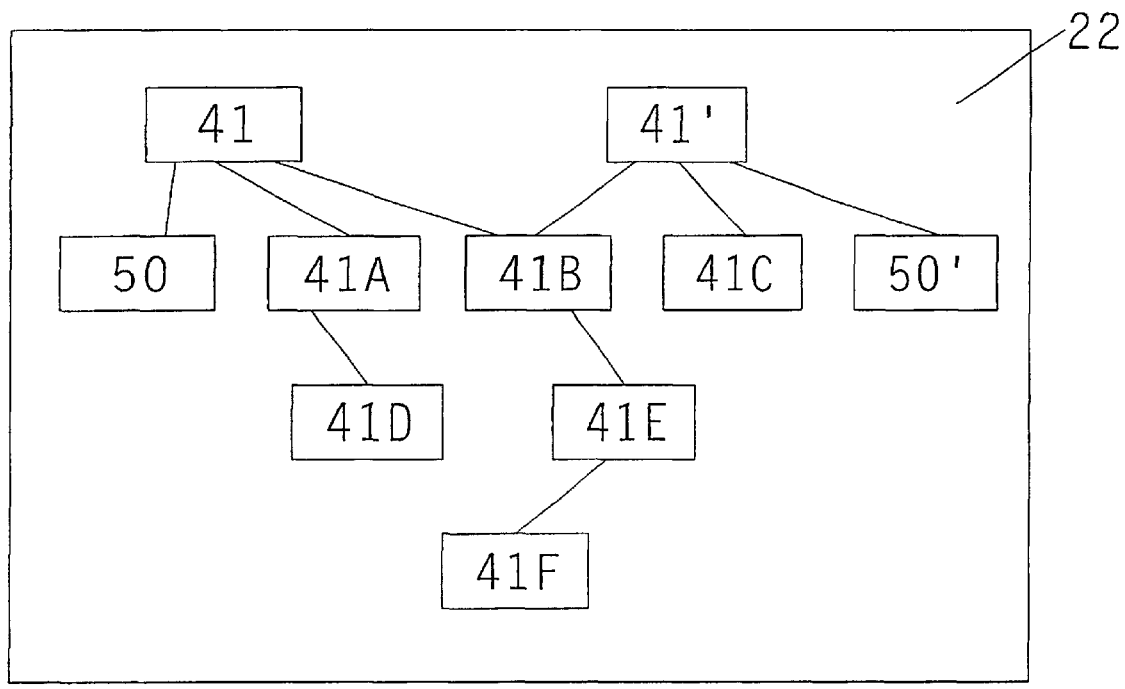
FIG. 10 shows a particular hierarchy of objects within a session manager, with some objects co-owned by conferences.
Figure 11:
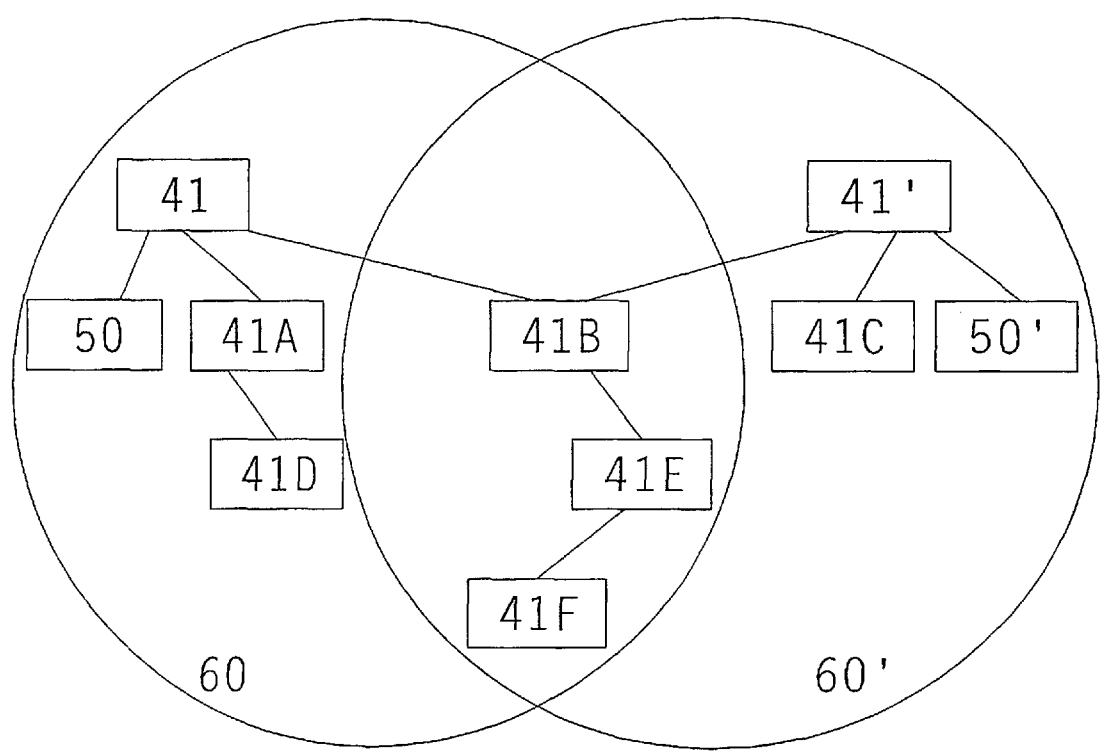
FIG. 11 shows the necessary lock groups that exist in order to facilitate ordered object access in the session manager.

Locks are implemented in the session manager by lock objects. These objects are part of the info objects for the conference, but not part of the application objects. FIG. 10 depicts two conference info objects: info object 41 and info object 41', with two locks objects: object 50 and object 50', belonging respectively to the conferences (in addition to the usual copies of application objects). These locks may then be used to lock any info object that belongs to the state of the conference represented by the conference object. For objects that belong to both conferences it is therefore necessary to unlock both locks to access the objects shared by the two conferences. FIG. 11 shows a diagram of the area of influences of the two locks. Here lock 50 is used to lock anything in locking domain 60, and lock 50' is used to lock anything in locking domain 60'. However object 41B, object 41E, and object 41F can only be locked through use of both lock 50 and lock 50'.

Figure 12:
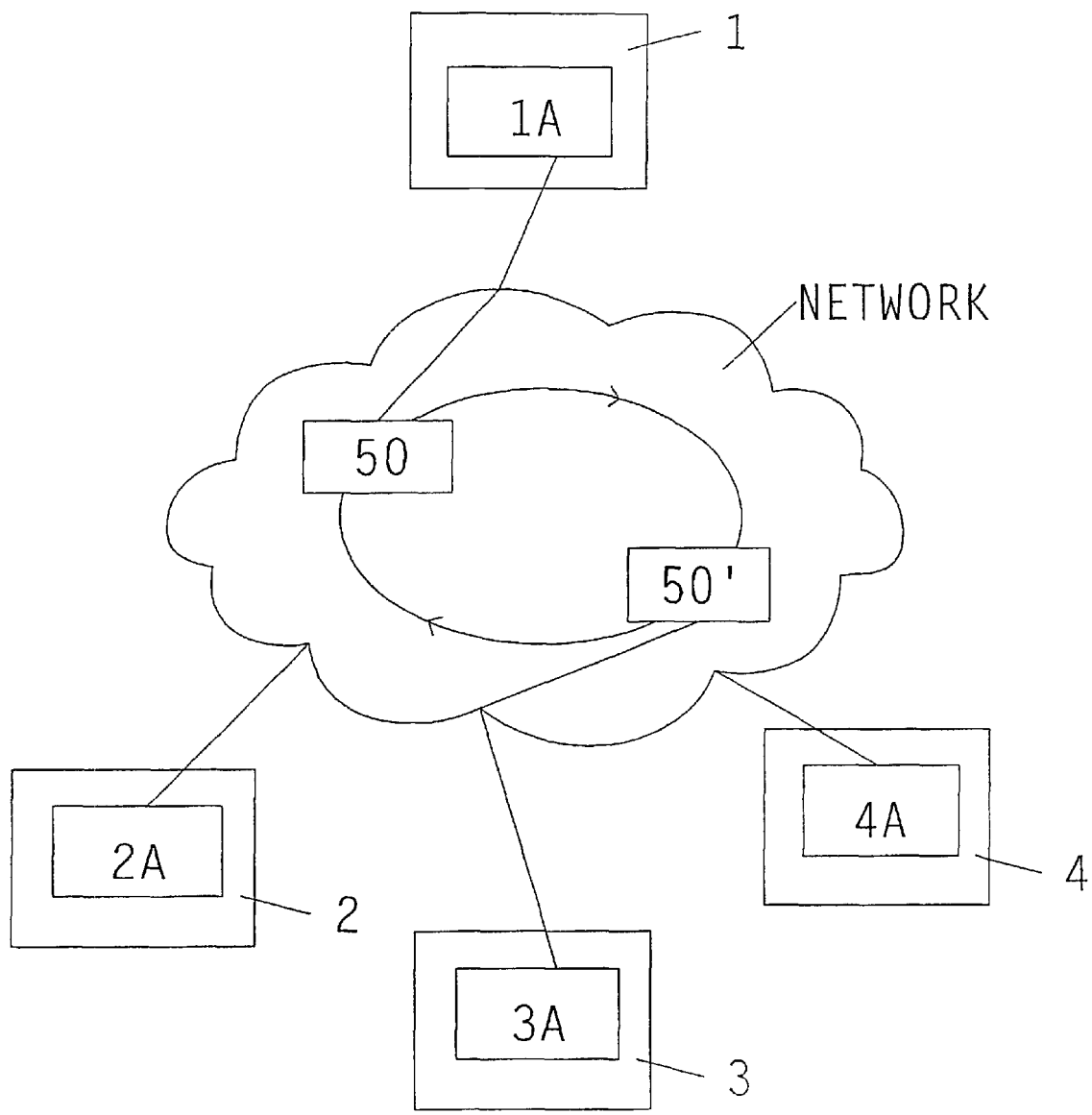
FIG. 12 depicts numerous workstations running session managers over a WAN and sharing data through the use of two locking tokens.

The tokens that unlock the locks are implemented using a prior art token-passing scheme. As depicted in FIG. 12, a token is associated with each conference and constantly circulates among all session managers that contain info objects for the conference. A session manager that does not need to alter any objects belonging to the conference will immediately pass the token on; otherwise, the session manager will retain the token until it has received permission from the other session managers to alter the objects, and done the alterations in its own repository. At that point, the session manager releases the token and sends the altered objects to the other session managers. A full discussion of token passing-techniques is out of the scope of this invention disclosure, as it is prior art and many references are available on techniques of token implementations. Issues such as lock contention can be resolved by adding both locks and tokens. This could occur down to a lock-per-object level in a particular conference hierarchy.

Therefore, as shown in FIG. 12, should workstation 4 (with session manager 4A) desire to access an object in conference 41', it waits until token 50' reaches workstation 4. In the diagram session manager 1A and session manager 1C are holding token 50 and token 50' respectively allowing them to access objects in conference 41 or conference 41' respectively.

Prior art literature on token-passing mechanisms deals with the issues of fault tolerance and performance. Our token passing scheme is structured on top of the same reliable multicast communication mechanism used to distribute info objects by the session managers.

Detailed overview of a session management system in a single workstation

Figure 18:
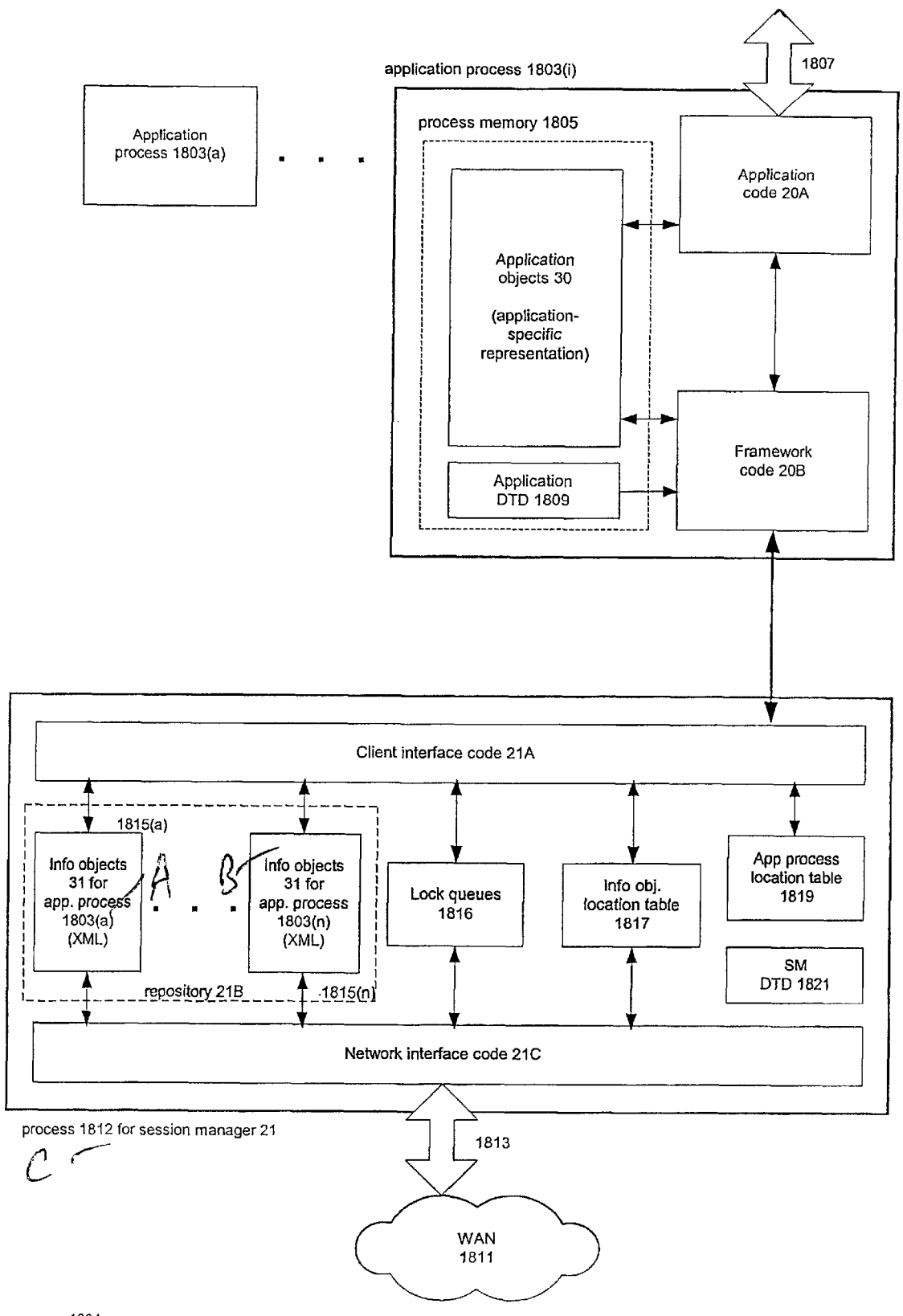
FIG. 18 is a detailed overview of a session manager and a set of application processes in a workstation.

FIG. 18 is a detailed overview of a session management system 1801 in a single workstation. System 1801 has two main components: a set of application processes 1803(*a . . n*) which are end points in conferences and a session manager process 1812 that maintains the distributed process state for each of the application. One of the application processes, application process 1803(*i*), is shown in detail. Application process 1803(*i*) is executing application code 20A, which may interact with a user, as indicated by arrow 1807. Process memory 1805 includes application objects 30 for the conference; the application objects have the form required for the application and the platform upon which the application process is executed. The interface between application process 1803(*i*) and session manager 1812 is framework code 20B, which executes in application process 1803(*i*). Framework code 20B translates between the XML representation of application objects 30 used in the process manager and the application-specific representation used in application process 1803(*i*). Translation to and from the XML representation is controlled by application document type definition 1809, which may be located anywhere where it is accessible to application process 1803(*i*).

Session manager process 1812 executes client interface code 21A and network interface code 21C as previously discussed; repository 21B contains information objects 31 for each of the application process 1803 in the workstation that is currently an end point in a conference. The information objects contain XML representations of session manager information 1903 and application information 1905 and may also include lock objects. Other information in session manager process 1812's memory includes the following:

Information object location table 1817 relates information object URLs to the locations of the information objects in repository 21B. Session manager process 1812 uses table 1817 to find the object in repository 21B that needs to be replaced when it receives a new version of the object from an application process or from the network.

Application process location table 1819 relates object URLs to process IDs for application processes, so that the session manager can determine which application process an object that has newly arrived from the network should be passed to.

Lock queues 1816 are queues for objects that have been modified in the application processes 1803, have been received from application processes 1803, and now need to replace their corresponding info objects and be placed on the network, but are subject to a lock object and must await arrival of one or more tokens in session manager process 1812 before the corresponding info objects can be replaced and the replacing info objects placed on the network. There is one lock queue for each combination of locks to which info objects in repository 21B are subject.

SM DTD 1821 is the DTD that the session manager processes use to translate session manager information 1903 to and from XML.

Case Study

A typical application scenario is presented here in order to demonstrate the functionality described in the previous sections. A simple network application, which creates or joins a conference and establishes a number of conference specific objects (i.e. objects which are shared between conference participants), is presented. The processes by which this happens and by which the conference specific objects are modified and updated across the network are demonstrated.

Overview

Figure 13:
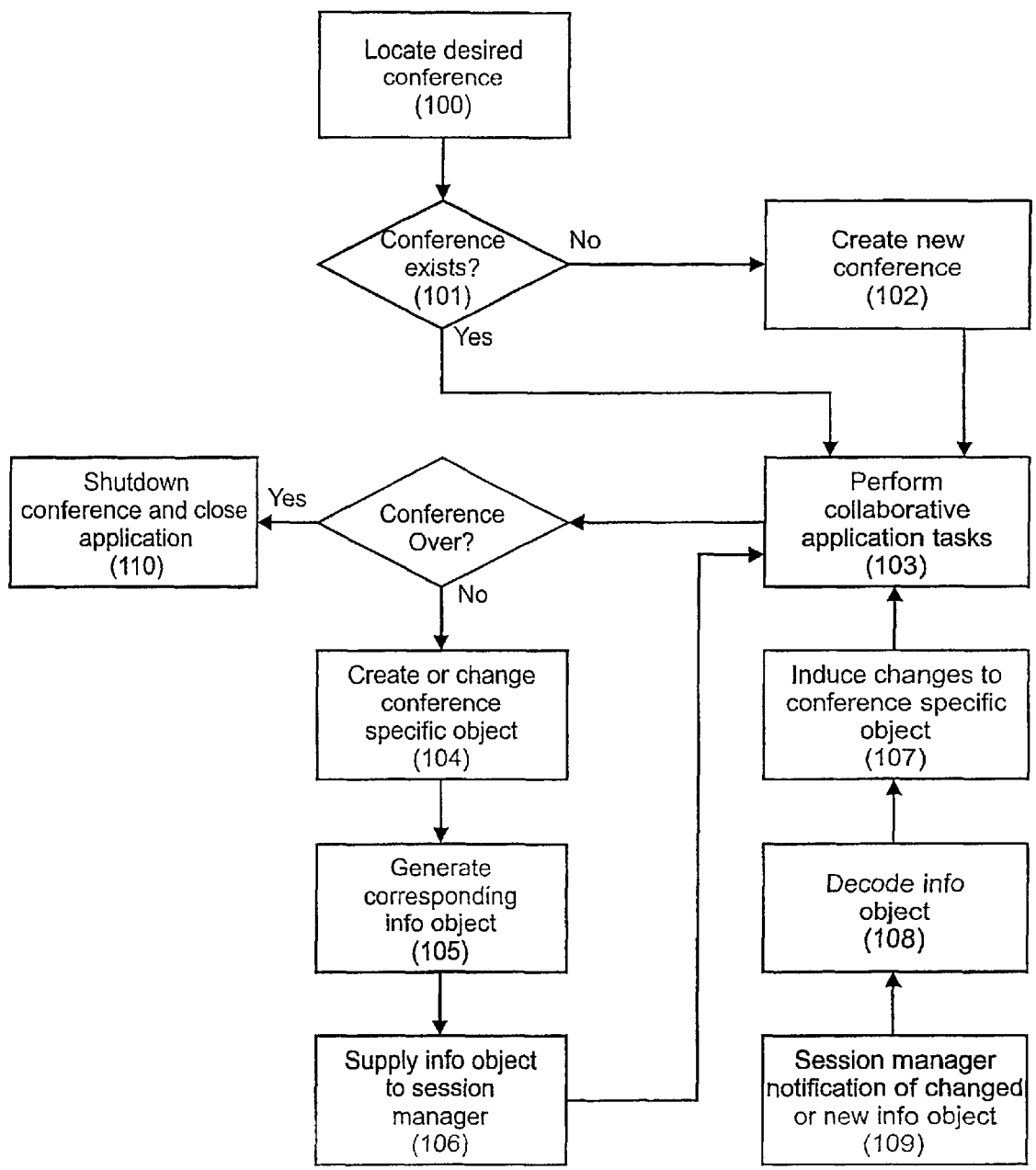
FIG. 13 is a high level flow chart of a typical network-based software application that is using our session manager.

In FIG. 13 the flow chart for the application level software of this typical software application is presented. As with most conference based applications the application starts out by presenting the user with a list of active conferences to choose from or attempts to join a predefined default conference. So the application begins (step 100) by requesting the session manager to locate a specific conference by name (for example, by URL). If (step 101) the conference does not exist then a request is made to the session manager to create the conference (step 102). If the conference exists and has been joined or, alternatively, a new conference has been created and joined, the application then falls into a state where it creates, destroys, and modifies objects specific to this conference (step 103). This is the normal running mode of the application. In this state, the application process will create or change objects in application objects 30 for the conference (step 104). When this happens the software framework will create an info object in the conference's info objects 31 corresponding to the changed application object (step 105). This info object is then supplied to the session manager (step 106), which incorporates the supplied info object to the conference's info objects 31, either by replacing the existing info object or adding the supplied info object. Thereupon, the session manager sends the supplied info object to the session managers for the other conference endpoints.

Also during the execution of the application, changes to an object belonging to a conference may be caused by another end-point. In this case the session manager for the other end point send a corresponding info object to the session manager 21 for this endpoint. Session manager 21 incorporates the corresponding info object into its info objects 31 for the conference and notifies the application (step 109, which responds by decoding the corresponding info object (step 108) and then incorporating the changes expressed in the info object into the corresponding application's conference-specific objects 30. Further discussion will now focus on the interval behavior of the session manager in the above situations.

Locating a conference

Figure 14:
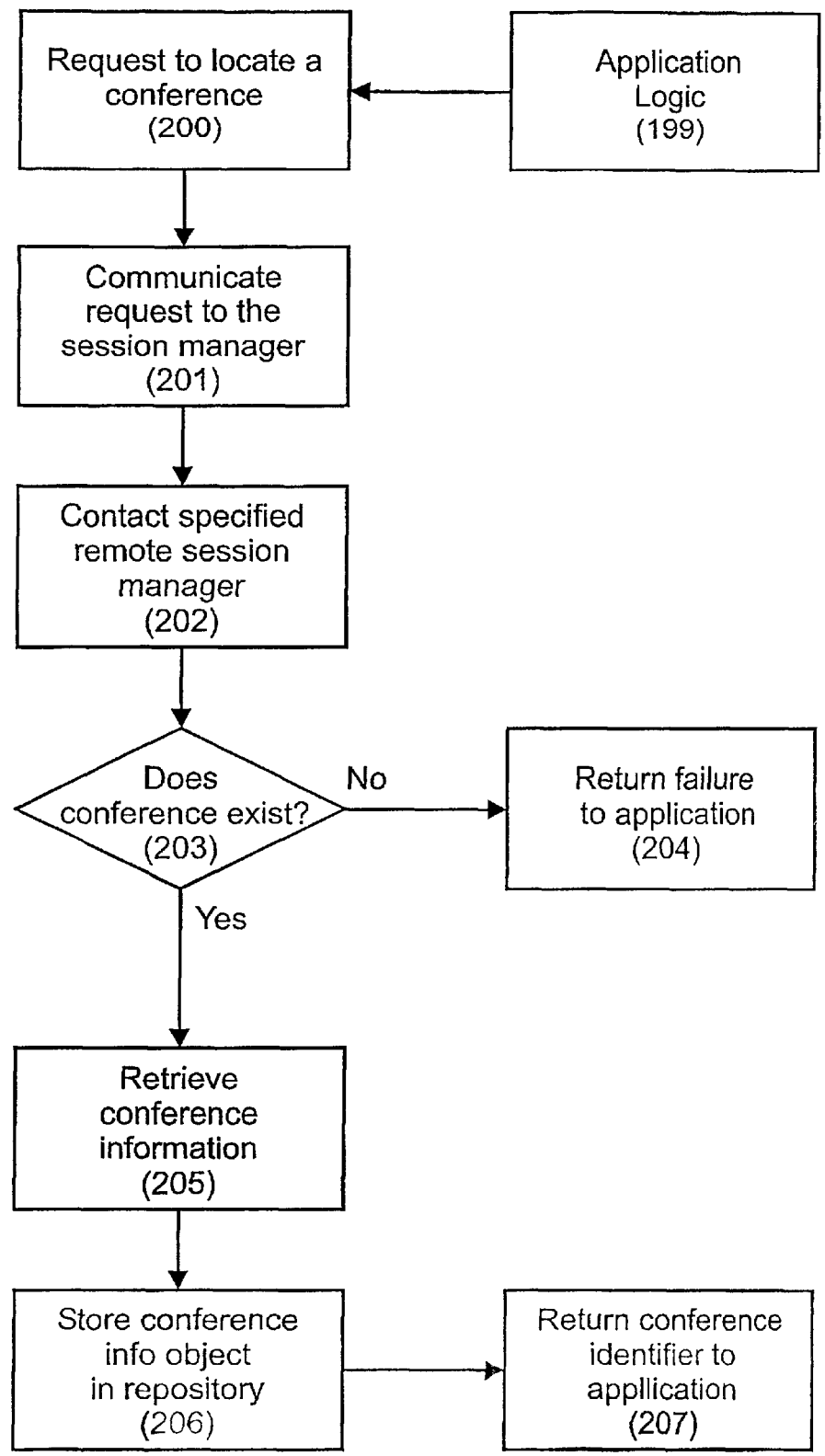
FIG. 14 is a flow chart showing the process by which our session manger locates conferences.

The flow chart in FIG. 14 expands on the process of locating a conference. When the application process 1803 requests the session manager to locate a conference, the application process specifies a destination workstation which might contain knowledge of the conference (step 200 and step 201). Session manager 21 uses the address to contact the remote session manager running on the destination workstation (step 202) and to query the conference's existence. If (step 203) the conference does not exist, then the remote session manager reports the failure to the local session manager, which reports it back to the application (step 204). However, if the conference does exist, the remote session manager sends a copy of its info objects 31 back to the requesting session manager (step 205). The local session manager adds the copy to its repository 21B (step 206) and sends the conference's identifier on to the application (step 207).

Creating or joining a conference

Figure 15:
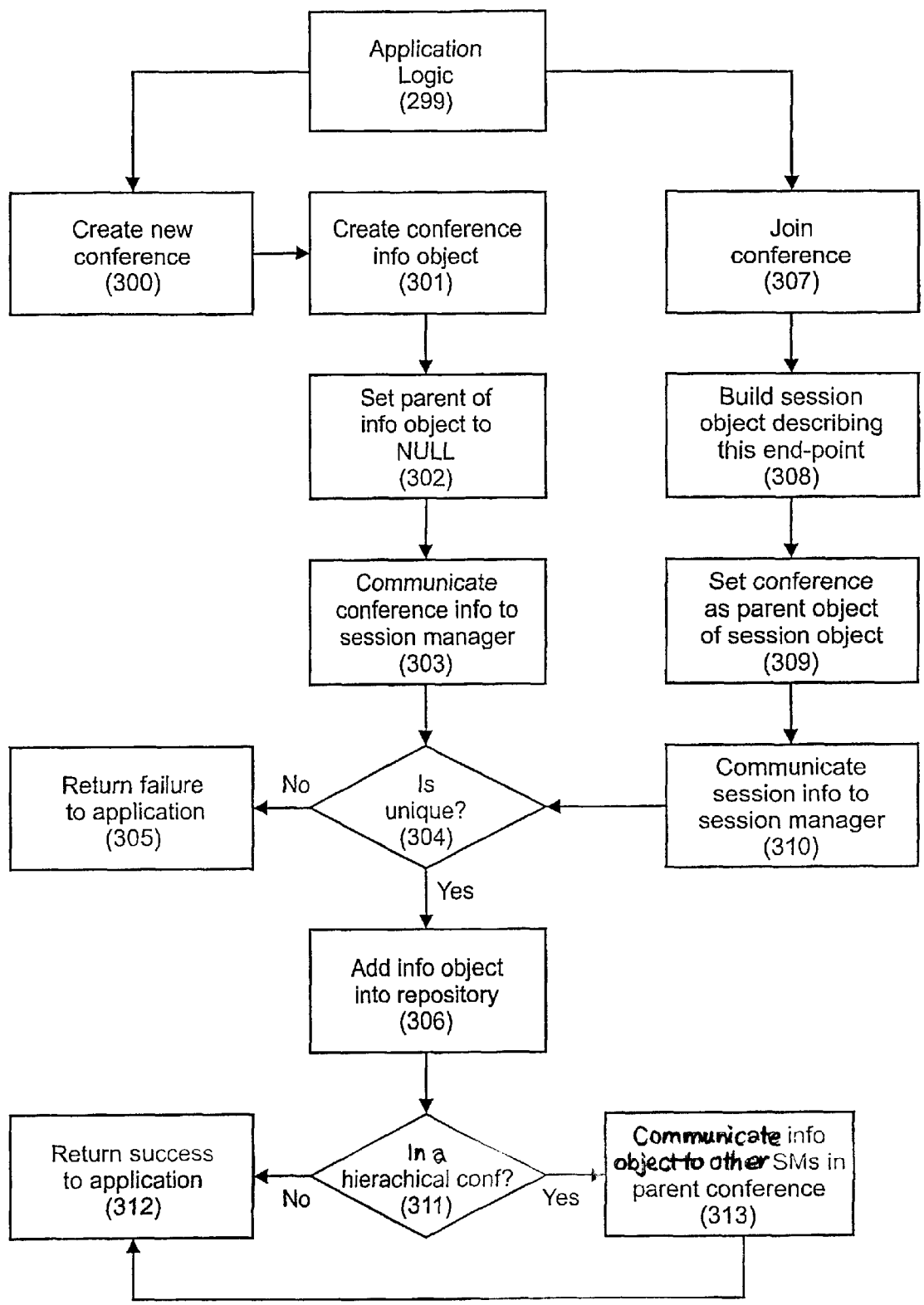
FIG. 15 shows a flow chart of the techniques used in our session manager for creating and joining a known conference.

FIG. 15 explains the process by which conferences are then created or joined within the session manager. Beginning with conference creation, should the application decide to create a conference (step 300), framework 20B creates a conference object for the conference (301) together with info objects corresponding to any other objects in the application's conference state. Since this is a conference object, the object's logical parent object is set to be NULL or nothing (step 302). The conference info object is then communicated to the session manager (step 303). The session manager checks the object for uniqueness (step 304) and if it is not unique, the session manager reports a failure to create a conference to the application process (step 305). However if the info object is unique, the session manager adds it and the info objects corresponding to the other objects in the application's conference state to repository 21B (step 306).

Continuing with joining a conference, should the application have rather decided to join a conference (step 307), then framework 20B creates a session info object (step 308). This info object uniquely identifies this application instance (end-point) within the specified conference. Framework 20B further sets the parent of the session info object to be the conference object for the conference that the application desires to join (step 309). The new session object is then communicated to the session manager (step 310), which once again checks the info object's uniqueness (step 304) and adds the info object to the repository if successful (step 306). Whenever any info object is added to the repository it is then checked to see if it ultimately has a parent that is a conference object (step 311). If it does, then that info object is communicated to the other session managers (step 313) before returning a successful operation (step 312) to the calling application.

Figure 16:
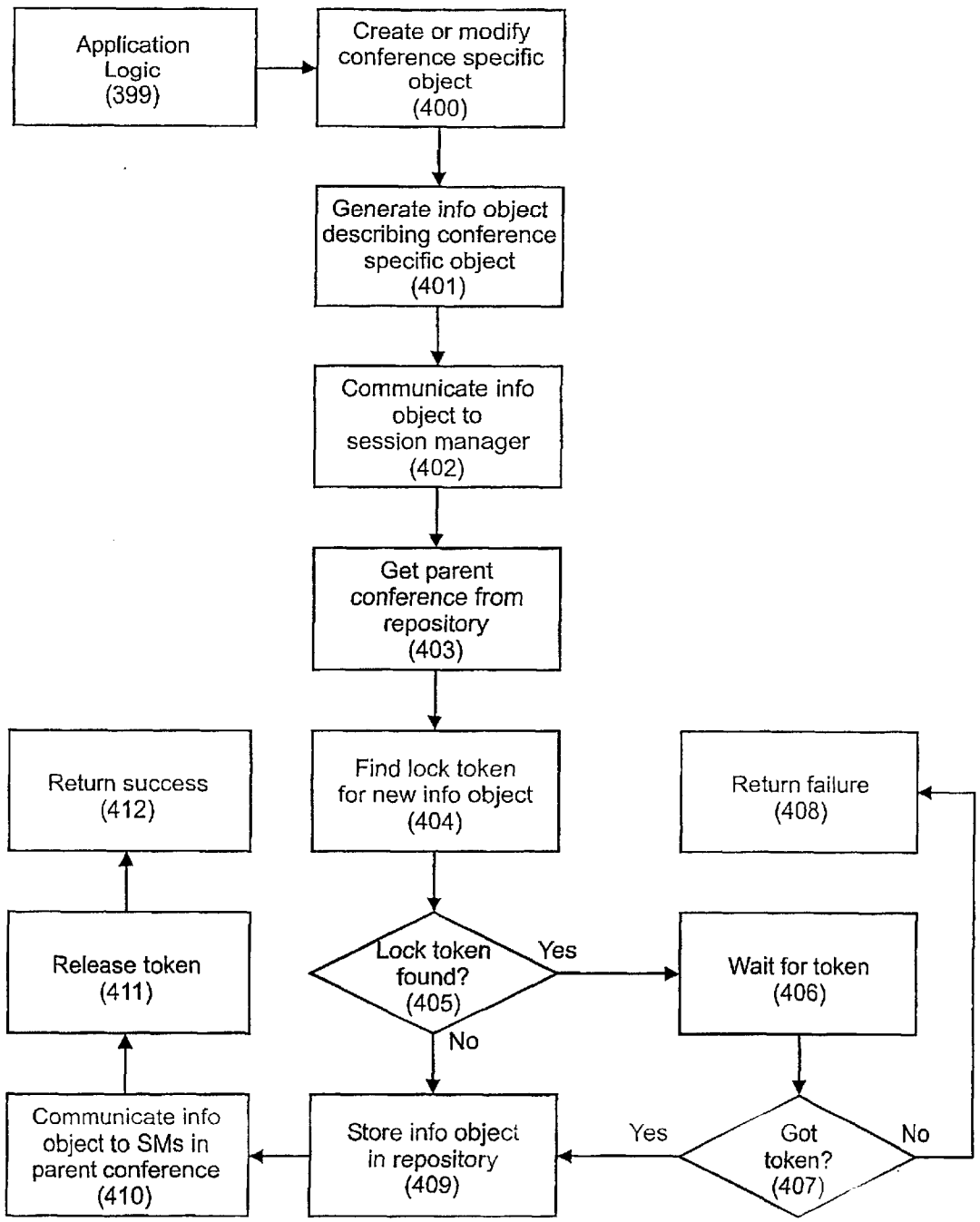
FIG. 16 contains a flow chart showing the process by which conference-specific objects are modified or created.

Details of adding an info object to a repository in response to a modification by the application process A more in-depth analysis of the addition of info objects to the repository is now presented in FIG. 16. The application generally begins by creating or modifying an object in its application objects 30 (step 400). The framework then generates a new info object to describe this changed or new application level object (step 401). This info object is communicated to the session manager (step 402), which proceeds by locating the conference info object for this info object's conference (step 403). Once the conference info object is located, the session manager determined whether it has a token for the conference's lock (step 404). If (step 405) a token is not found then the session manager waits for ownership of this token (step 406). If (step 407) the session manager fails to get the token then an error is reported back to the application (step 408). However if the token obtained, then the new info object is stored in the repository (step 409). If there is no lock, then the session manager simply adds the object to the repository (step 409).

Once the info object is added to the repository, the session manager communicates it communicated to all other session managers in the same parent conference (step 410) and then releases the token (if one was used) (step 411). The session manager then reports a successful change to the application (step 412).

Figure 17:
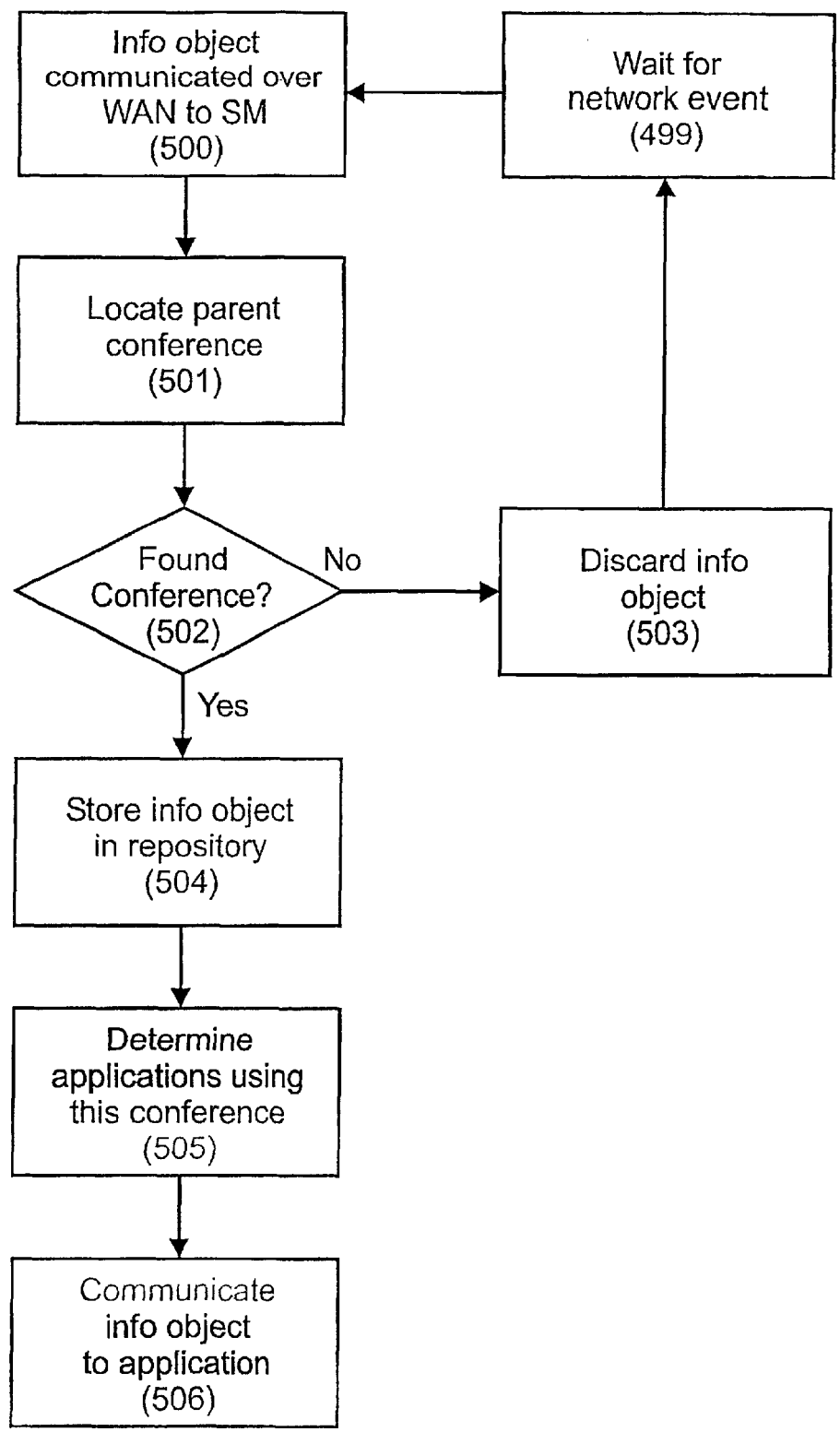
FIG. 17 depicts the flow chart for the session manager's response to object updates from the network.

Details of adding an info object received from another session manager to the repository Finally FIG. 17 depicts the behavior of the session manager when a new or updated info object arrives over the network as the result of a change to an application object 30 by a remote endpoint. Firstly the info object resulting from the change arrives (step 500) at the session manager, which first attempts to locate the info object's parent conference object in its repository (step 501). If (step 502) the conference object is not found, the session manager simply discards the info object (step 503), as it is not relevant to any endpoints running on this workstation. However, if a conference object is identified, then the info object is incorporated into the repository (step 504) and the session manager then determines which applications on its workstation are using that conference (step 505). The session manager then communicates (step 506) the received info object to each local application which is an endpoint of the conference to which the received info object belongs.

CONCLUSION

The foregoing Detailed Description has disclosed to those skilled in the technical areas to which the invention pertains the best mode known to the inventors of making and using their completely distributed, completely scalable, and completely extensible system for managing conference state. Characteristics of their invention include maintaining identical copies of a conference's state in the session managers and endpoints in all of the computer systems that have endpoints of the conference, including a distributed locking mechanism in the session manager's conference state and using it to ensure that the copies remain identical, using a representation of hierarchies in the conference state which is valid in any computer system, employing a representation of the endpoint's portion of the conference state in the session manager conference state which is differently from that used in the endpoint, and employing a translator in the endpoint to translate between the representation used in the endpoint and the representation used in the session manager.

Session manager having some or all of the above characteristics may be implemented in many ways that are different from but equivalent to the ways disclosed in the Detailed Description. Since that is the case, the Detailed Description is to be understood as being in all respects exemplary and not restrictive, and the breadth of the invention disclosed herein is to be determined not from the Detailed Description, but rather from the claims as interpreted with the full breadth permitted by the patent laws.

What is claimed is:

1. A session manager that executes in a computer system in which an endpoint of a conference is executing, the conference being made up of endpoints connected by a network, the endpoint including endpoint conference state for the conference, and the session manager comprising:

session manager conference state including a distributed locking mechanism associated with the conference, an interface to the endpoint, and an interface to the network, the endpoint providing any portion of the endpoint conference state which the endpoint has altered to the session manager via the interface to the endpoint, the session manager responding thereto by sending the altered portion via the interface to the network to other session managers for the other endpoints when the locking mechanism associated with the endpoint's conference indicates that the other session managers are ready to receive the altered portion, and responding to receipt of an altered portion from another session manager in the network interface by providing the received altered portion to the endpoint for the conference via the endpoint interface for incorporation into the endpoint's endpoint conference state.

2. The session manager set forth in claim 1 wherein:

the session manager conference state further includes a copy of the endpoint conference state and the session manager incorporates any changes in the endpoint conference state into the copy thereof in the session manager conference state.

3. The session manager set forth in claim 2 wherein:

the endpoint conference state has a hierarchy; and the copy of the endpoint conference state in the session manager conference state retains the hierarchy.

4. The session manager set forth in claim 3 wherein:

the session manager conference state has a hierarchy and the copy in the session manager conference state is included in that hierarchy.

5. The session manager set forth in claim 4 wherein:

the hierarchy in the session manager conference state has a representation which remains valid when the session manager conference state is sent to a different computer system.

6. The session manager set forth in claim 4 wherein:

the hierarchy is an acyclic directed graph.

7. The session manager set forth in claim 2 wherein:

an endpoint may become an endpoint for a preexisting conference;

the endpoint employs the endpoint interface to specify a location of a copy of the preexisting conference's session manager conference state to the session manager;

the session manager responds thereto by using the network interface to obtain the copy from the location, incorporating the copy into the session manager conference state, and providing the endpoint conference state in the copy to the endpoint via the endpoint interface.

8. The session manager set forth in claim 2 wherein:

an endpoint may establish new endpoint conference state for a new conference and provide the new endpoint state to the session manager;

the session manager responds to the new endpoint state by making new session manager conference state and incorporating the new endpoint state therein; and the session manager responds to a request from another session manager for the new session manager conference state by providing the new session manager conference state to the other session manager via the network interface.

9. The session manager set forth in any of claims 2 through 8 wherein:

the copy of the endpoint conference state has a representation which is different from the representation thereof in the endpoint; and the session manager includes a translator which translates any portion of the endpoint conference state which the endpoint provides to the session manager from the representation thereof in the endpoint conference state into the different representation thereof in the session manager conference state and any portion of the endpoint conference state which the session manager provides to the endpoint from the different representation into the representation thereof in the endpoint conference state.

10. The session manager set forth in claim 9 wherein:

the translator executes in the endpoint.

11. The session manager set forth in claim 10 wherein:

the different representation is XML and the translator translates between XML and the representation in the endpoint conference state according to a DTD that is particular to the endpoint.

12. The session manager set forth in claim 9 wherein:

the session manager provides any information that is included in the session manager conference state to the network in the representation used in the session manager conference state.

13. The session manager set forth in claim 1 wherein:

there are endpoints for a plurality of conference executing in the computer system, each endpoint having endpoint conference state, the session manager further comprises session manager conference state for each of the plurality of conferences, each of the locking mechanisms therein being associated with a conference of the plurality thereof, and any of the plurality of endpoints that has altered its endpoint conference state provides the altered portion thereof via the endpoint interface to the session manager, the session manager responding thereto by sending the altered portion via the network interface to other session managers for the conference to which the endpoint that has altered its conference state belongs when the locking mechanism associated with the conference indicates that the other session managers are ready to receive the altered portion, and responding to receipt of an altered portion via the network interface for any of the plurality of conferences from another session manager by providing the received altered portion via the endpoint interface to the endpoint for that conference for incorporation into that endpoint's endpoint state.

14. The session manager set forth in claim 13 wherein:

the session manager comprises session manager conference state only for those conferences which currently have endpoints executing in the computer system.

15. The session manager set forth in claim 13 wherein:

the session manager conference state for each conference further includes a copy of the endpoint conference state for the conference's endpoint and the session manager incorporates any changes in the endpoint conference state into the copy thereof in the session manager conference state.

16. The session manager set forth in claim 15 wherein:

the endpoint conference state has a hierarchy; and the copy of the endpoint conference state in the session manager conference state retains the hierarchy.

17. The session manager set forth in claim 16 wherein:

a portion of an endpoint's conference state may be shared by a plurality of the conferences; and the session manager alters the copy of the shared portion only when the locking mechanism associated with each of the plurality of conferences indicates that the other session managers for that conference are ready to receive the altered portion.

* * * * *